(No Model.) 5 Sheets—Sheet 1.
C. B. WITHINGTON.
GRAIN BINDER.

No. 378,227. Patented Feb. 21, 1888.

WITNESSES
Wm A. Skinkle
Alfred C. Newman

INVENTOR
Charles B. Withington.
By his Attorneys
Parkinson & Parkinson

(No Model.) 5 Sheets—Sheet 4.
C. B. WITHINGTON.
GRAIN BINDER.

No. 378,227. Patented Feb. 21, 1888.

WITNESSES
Wm A. Skinkle
Alfred E. Newman

INVENTOR
Charles B. Withington.
By his Attorneys
Parkinson & Parkinson (No Model.) 5 Sheets—Sheet 5.

C. B. WITHINGTON.
GRAIN BINDER.

No. 378,227. Patented Feb. 21, 1888.

WITNESSES
Wm A. Skinkle
Alfred C. Newman

INVENTOR
Charles B. Withington.
By his Attorneys
Parauson & Parkinson

UNITED STATES PATENT OFFICE.

CHARLES B. WITHINGTON, OF JANESVILLE, WISCONSIN.

GRAIN-BINDER.

SPECIFICATION forming part of Letters Patent No. 378,227, dated February 21, 1888.

Original application filed January 14, 1881, Serial No. 24,009. Divided and this application filed January 15, 1884. Renewed July 23, 1887. Serial No. 245,076. (No model.)

*To all whom it may concern:*

Be it known that I, CHARLES B. WITHINGTON, of Janesville, in the county of Rock and State of Wisconsin, have invented certain new and useful Improvements in Grain-Binders, of which the following is a specification.

My invention relates, in part, to that class of grain-binders heretofore patented by me, in which the binding-arm and band-securing mechanism are mounted upon a reciprocating carriage which moves inward toward the grain-chute or delivery-point of the harvester to receive and encircle the grain, and then outward to bind and discharge the sheaf; in part, also, to grain-binders whenever a vibrating arm is employed having a compressor pivoted thereto along its length and closed in by the descent of said arm; further, to knotting devices adapted for use in connection with such reciprocating carriage or any stationary frame, and to accessory mechanism for operating said devices when used with such carriage; and, finally, to a holder adapted to yield slack to the knotter concurrently with the demand for it while retaining a firm grasp upon the cord; and it consists in combining with a vibrating arm a compressor pivoted thereto in such manner that it may be moved lengthwise, shifting its point of connection as the binder-arm opens and closes, and means whereby it may be given a pivotal movement whenever, by the closing of the binding-arm, it has reached the extreme limit of its relative sliding movement in the corresponding direction; in combining with a reciprocating binding-carriage and a vibrating binding-arm carried thereby a compressor pivoted to the binding-arm in such manner that it may have a sliding movement distinct from its pivotal movement, a rock-shaft link connected to the heel end of said compressor, and a mutilated gear connected to the rock-shaft by a pitman and engaging with a rack and delay-surfaces upon the supporting-frame as the carriage moves back and forth, whereby the compressor may be given a pivotal movement to carry it in toward the binding-arm after its sliding movement terminates in the descent of said arm; in combining with a knotter a rack by which it is given, first, a movement in one direction and then in the reverse direction in the same knotting operation as it is borne along upon the traveling carriage; in a knotter of novel construction; in combining with the stationary jaws of the holder a moving jaw or holder-plate actuated in such manner that after securely clamping the end of the cord it has an additional onward movement to draw a slack length from the spool, and afterward, during the knotting operation, retreats sufficiently to yield up this slack length while retaining the end still fast, and in the various other combinations and details of construction hereinafter pointed out.

For the purpose of illustrating my invention, I shall show it in connection with a binding-machine of that type originated by me and covered, among others, in Letters Patent issued to me on the 7th day of March, 1876, numbered 174,454. I have not deemed it necessary, however, to show the harvesting-machine in general as distinguished from the binder, nor all the parts of a grain-binder of such type of construction, as all of these parts are well and commonly known.

A represents a stationary frame, which is attached to the harvester in any suitable way. This frame is to be arranged, as heretofore, on the stubble side of the machine, and is provided with ways $a$, on which a carriage, B, supporting the effective binding mechanism, is mounted and actuated—as by a chain—to reciprocate to and from the harvester-elevator, over the head of which the grain is delivered to the usual receiver or binding-table. In the upper part of the carriage is journaled the customary rock-shaft, B', having keyed thereto the binder-arm C, to which is also connected the tucker $c$, controlled in such manner that as the binder-arm approaches the end of its downward stroke said tucker will be projected to carry the band ends into the range of the securing devices.

Where the driving-chain and latching-lever described and claimed in Letters Patent No. 186,186, granted to me on the 29th day of January, 1877, are used, the rock-shaft will of course be oscillated by a pitman-connection with the lever on said chain. When, however, different means are employed for producing the traversing motion, said shaft will be moved in such manner as deemed most compatible with said means. Should this shaft and other mechanism about to be described form part of a stationary binder, any ordinary wrist-pin and pitman will do.

A compressor, D, is attached to the binder-arm by means of a pivot-pin, D', passing through said arm and turning therein. The compressor is intended, however, to slide longitudinally, shifting its point of attachment to the binder-arm in the movement of the latter, and it therefore is not fast to the pivot-pin, but passes snugly through a slot, $d$, in the head of the pin. Along the inner side of the compressor is a rib, $d'$, running parallel with its length, for which provision is also made in the slotted head of the pivot-pin, so that it shall form no bar to the sliding movement. An annular rim or flange, $D^2$, is fixed to the face of the binder-arm, opposing the compressor, and the pivot-pin passes through this centrally. The rim or flange is of such height as to interfere with the rib on the compressor, and to permit the free passage of this rib in the sliding movement it is slotted at two points, $d^2$, diametrically opposite to each other. At the upper side of the lowermost notch is placed a guard or stop, $d^3$. Otherwise the interior of the annulus is unobstructed.

The rib on the inside of the compressor is notched at $d^4$, the notch being wide enough to accommodate the thickness of the annulus and located at a distance from the upper end of the rib about equal to the inside diameter of said rim, so that the upper section thereby cut off may be received and rotated inside of said rim. At the extreme upper end of the rib is a slight projection, $d^5$, which in the pivotal movement is brought against the stop or guard $d^3$, striking it beneath, or in the direction indicated by the arrow, and thus aligning the rib with the two notches in the rim and causing it to pass through them, so that the compressor when the projection reaches the stop commences its sliding movement. Beyond this projection and standing out alone from the face of the compressor at a distance from the end of the rib equal to the thickness of the annular rim is a stop, $d^6$, of such length that it cannot pass through the slots in said rim, and therefore when it comes in contact with the periphery of the rim will stay the compressor with the notches in its rib opposite the ends of the semicircular flanges left by said slots, that they may engage therewith and allow the compressor to turn on its pivot.

The heel end of the compressor is connected by means of an elastic link, E, to a crank-arm, $e$, from a rock-shaft, E', just above the main rock-shaft, or that which actuates the binder-arm. At the front end said second rock-shaft, E', is also provided with another crank-arm, $e'$, connected by a pitman, $e^2$, to a wrist-pin upon a mutilated gear-wheel, $E^2$, mounted upon the reciprocating carriage by a suitable stud-bearing, $e^3$, or other pivot. The mutilated gear-wheel has two plain stop faces or shoes, $e^4$, on opposite sides and parallel with each other, and a single section of gear-teeth between them on one side of the wheel, none on the other. Beneath this wheel on the stationary frame is arranged a rack, $a'$, with which the gear-section engages at proper intervals, and at each end of the rack is a plain section or delay-surface, $a^2$, on which the stop faces or shoes rest and slide, thereby locking the wheel in position during certain portions of the reciprocating movement of the binder-carriage.

Figures 1, 2, 3, 4, 5, 6, 7:
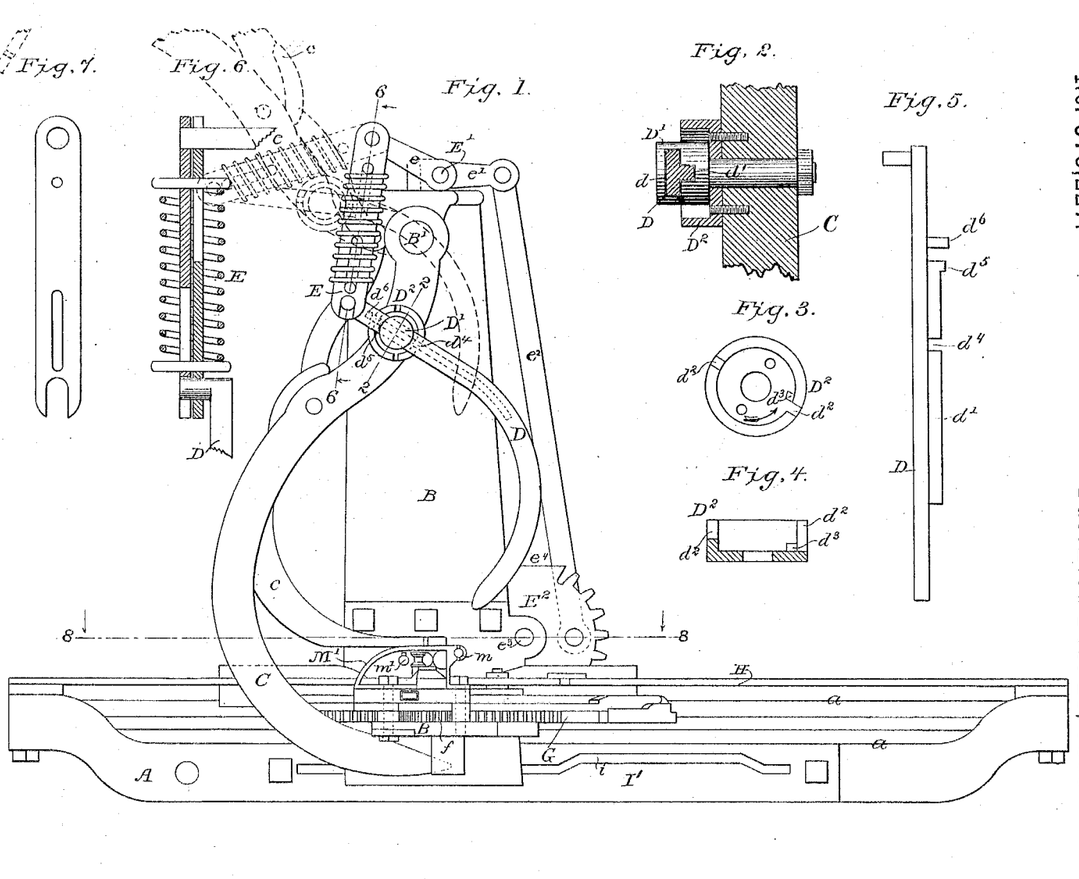
Figure 1 is an elevation of a binding mechanism embodying my improvements seen from the rear of the harvester and with the binding-table removed and dead frame-work omitted to more fully expose the effective parts.
Fig. 2, a detail section taken upon the correspondingly-numbered line in Fig. 1, showing the journal-bearings for the compressor-arm.
Figs. 3 and 4, details in elevation and section of the annular rim or flange attached to the binder-arm and connected with the compressor to control the movements of the latter.
Fig. 5, an edge view of the compressor-arm from the stubble side of the machine.
Fig. 6, a detail in section, upon the line 6 6 indicated in Fig. 1, of the elastic or spring link for tightening the compressor-arm around the bundle.
Fig. 7, a side elevation of one of the movable blades of the same.

The stop-faces and delay-surfaces are arranged with reference to the other mechanism in such manner as that when the binding-arm opens the rock-shaft and crank-arm connected with the compressor remain motionless and rigidly locked against movement; but when the binder-arm closes at the end of the inward traverse, sliding the compressor through its pivot-bearing and across the annular rim, and concurrently closing it until the stop $d^6$ strikes the periphery of the rim, and the arm being then at the limit of its downward movement, with the parts in the position represented in Fig. 1, and the carriage is started out, the toothed section of the mutilated wheel will engage with the rack, causing the pitman to be first drawn down, acting upon the heel of the compressor through the rock-shaft and the elastic link-connection, to turn said compressor in its pivot-bearing and close it in a further distance toward the binder-arm from the position indicated, then immediately after, by the continued revolution of the mutilated gear, carrying said pitman up and depressing the heel of the compressor to release said compressor slightly and relax the gavel, the knotter having meanwhile partly completed the laying of the knot.

As the binder-arm rises at the end of the outward traverse, the compressor cannot rise freely with it, owing to the eccentric arrangement of their pivots and connecting-pieces. The link will therefore carry the heel of the compressor down, causing the stop pin or projection $d^5$ to travel within the annular rim in the direction indicated by the arrow until it strikes the guard $d^3$, when, in the further movement of the binder-arm, the compressor will slide through its pivot-pin and through the rim until it finally assumes the position indicated in dotted lines. As the binder-arm again descends, the compressor will be a second time projected in reverse direction until the stop $d^6$ strikes the periphery of the annular rim, which will happen at the moment the binder-arm has completed its descent. Then the compressor will again be free to turn pivotally.

Figures 11, 12, 13, 14, 15, 16, 17:
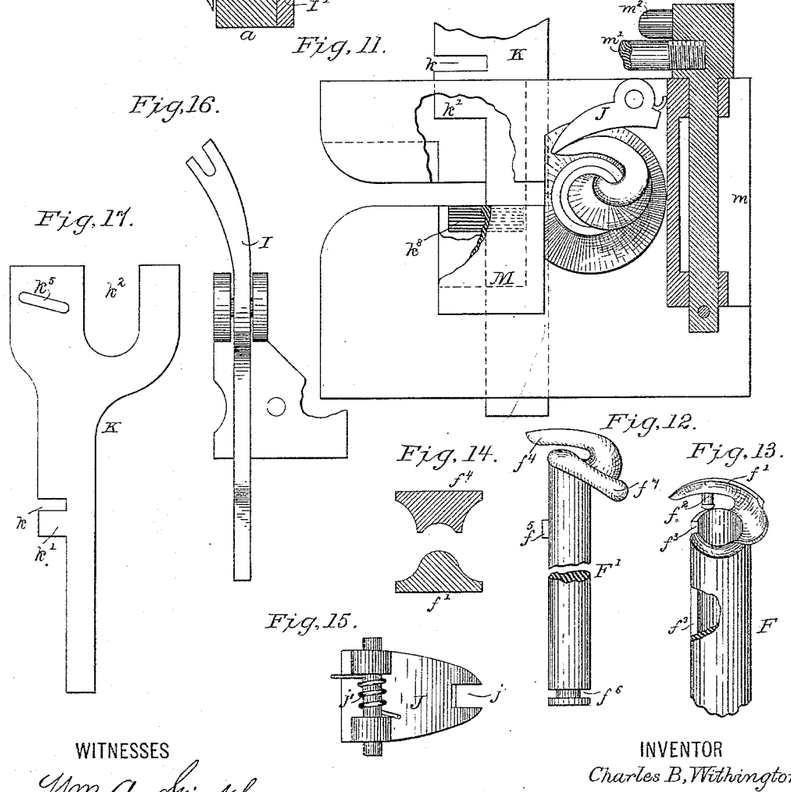
Fig. 11, a plan, partly in section and with cap removed, of the tyer and holder-head.
Figs. 12 and 13, details of the knotter, showing the upper and lower jaws separately.
Fig. 14, a detail section of the knotter-jaws enlarged.
Fig. 15, a rear elevation of the spring-dog or stripper acting upon the knotting-jaws.
Figs. 16 and 17, details, respectively, of the lever for raising the upper jaw of the knotter and of the cutter and holder bar.

For the purpose of forming the knotter, a short tubular shaft, F, is mounted vertically in suitable bearings at the inner end of the reciprocating carriage, and at its lower end is provided with a gear-pinion, $f$, whereby it will be turned. At its upper end it has a cam-shaped projection or jaw, $f'$, as shown in Fig. 13 of the drawings, curved and projecting outside the circumference of the shaft. A short pendent stud or stop, $f^2$, is arranged a little distance from the end of this jaw beneath its chin. A longitudinal slot, $f^3$, extends downward a portion of the length of the shaft, and within the shaft is arranged a second shaft or spindle, F', provided at its upper end with a hooked or curved projection or jaw, $f^4$, corresponding to the jaw on the upper end of the tubular shaft, but converse thereto, so that when the inner shaft is depressed the two jaws will come together. A small stud, $f^5$, projects from the side of the inner shaft into the slot in the outer or tubular shaft, thereby insuring the proper relative position of the upper and lower jaws and causing shafts and jaws to rotate together, while at the same time longitudinal movement of the inner shaft relatively to the outer will be permitted to open the jaws away from each other or close them together. The upper surface of the lower jaw is convex and the lower surface of the upper jaw concave, as in Fig. 14, and these surfaces are advisably serrated. At the lower end or foot of the inner shaft or spindle is an annular groove, $f^6$, to receive a yoke or collar from the end of an actuating-lever, whereby it will be projected and retracted, and at the upper end is an inclined way or guide, $f^7$, which assists to guide the cord in proper position as the knotter rotates, so as to form the loop. For compactness this way or guide, which sets out considerably from the periphery of the spindle, is received in the seat or shell formed upon the upper end of the tubular shaft immediately behind the lower jaw carried by the latter.

Figure 10:
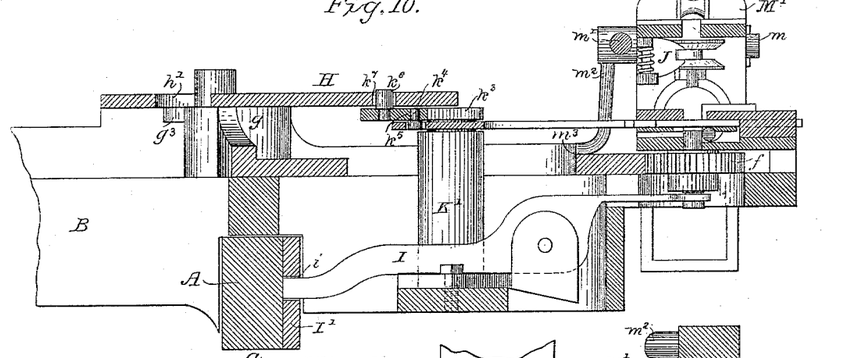
Fig. 10, a section on the correspondingly-numbered line in Fig. 8 through the knotter and holder-head and the mechanism for actuating the respective instrumentalities therein.

A toothed sector, G, is pivoted to the standing carriage at $g$, being arranged so that its main gear-section $g'$ will engage with the knotter-pinion fixed to the lower end of the tubular knotting-shaft. This sector is also provided with a curved portion at its rear end, projecting outside of the circumference of the main gear-section and carrying an internal gear-section opposite to the blank space at the end of said main section, which second gear-section engages with the knotter-pinion on the outside thereof as it leaves the first or main section to reverse the motion of the knotter at the proper moment. Near to the axis of the sector is fixed a crank-arm, $g^3$, having a pin, $g^4$, carrying an anti-friction roll, which projects into a cam-slot in a fixed plate, H, on the stationary frame. This cam-slot has, first, a straight reach, $h$, at its outer or stubble end, then an incline, $h'$, trending, in the present style of machine, where the bracket is overhung from the front, toward said front of the machine, and, finally, a second straight reach, $h^2$, at its inner end parallel to the fixed reach at the outer end. Thus, supposing the binder-arm to have just descended and the anti-friction roll on the sector-crank to be at the inner end of the straight reach $h^2$, as it should be at this moment, the initial outward movement carrying it through this straight reach will not disturb the sector; but as it strikes the incline said sector will be gradually swung in such direction as to rotate the knotter. As it nears the end of the incline the outer rack on the sector will engage with the knotter-pinion, which at the same time will leave the external or spur rack and the knotter will be reversely rotated. Finally, entering and traversing the outer straight reach, the sector will be held stationary until the binder-arm rises and until the anti-friction roller strikes the incline in the next inward traverse of the binding-carriage, when the preceding motion will be reversed to bring the knotter into position for the next tying operation. The sector simply gives the knotter its rotation and reverse rotation. In order to open the upper or movable jaw away from the lower, a lever, I, is pivoted to a bracket mounted in the lower portion of the reciprocating carriage adjacent to the tying-head, as shown in Fig. 10 of the drawings, one arm of said lever being forked and extended sufficiently to engage in the annular groove at the foot of the spindle which carries the movable knotting-jaw, and the other arm extending to and entering a cam-slot, $i$, in a plate, I', attached to the inner or central way of the stationary frame. Said cam-slot is of the right shape to move the spindle and the attached knotting-jaw at the proper intervals to positively open and close said jaw toward and away from the underlying stationary jaw, so that when the loop has been formed and the ends of the cord crossed thereover said jaws shall be open to receive the crossed strands, and immediately thereafter shall close to clamp them firmly, while the loop is pulled or pushed off upon them. This closing takes place just before the reverse movement of the jaws—that is, they are at that moment about to pass off of the main rack on the sector and come into engagement with the short internal rack, so that as soon as the end strands have been grasped the jaws will be moved in such direction as to pull or back out of the loop.

A spring-dog or stripper, J, is pivoted to the upper side of the plate in which the knotter revolves, and arranged to rest at its outer or free end upon the outer edge of the knotter, bearing chiefly on the lower section of the latter. In this free end of the dog is a notch, $j$, which in said reverse movement admits the end strands, while the fingers on each side engage with the cord to shed the loop and tighten the knot, as hereinafter described. A coiled spring, $j'$, causes the dog to bear upon the knotter constantly.

A cord-holder is arranged in front of and below the knotter, and consists of a holder-bar, K, reciprocating across the receiving-slot in the base-plate supporting said knotter, which bar is cut away at its outer end, or rear end relatively to the structure of the machine, to make a guide received in appropriate channel in the plate, and has a notch, $k$, in its inner edge, leaving a tongue or projection, $k'$, between the notch and the cut-away portion somewhat wider than the receiving slot or channel. The inner or front end of this holder-bar is forked; the fork $k^2$ being arranged to embrace a post, K', on the reciprocating carriage, on which is also sleeved a crank-arm, $k^3$, provided with a stud, $k^4$, which enters a slot, $k^5$, in one arm of the fork. The crank-arm is further provided with a pin, $k^6$, having an anti-friction roller, which enters a cam-slot in the plate H, the action of which is presently explained. Obviously the vibration of the crank-arm will reciprocate the holder-bar carrying the tongue $k'$ across the slot in the plate.

The holder-bar as it crosses the slot clamps the end of the cord against the underlying surface of the channel in the base or supporting plate. If preferred, for more efficient holding, its under surface may be serrated, and instead of the bottom of the channel forming the converse jaw said bottom may be cut away and a serrated roller, $k^8$, arranged in the cut-away portion at one side of the receiving-slot, the holder-bar riding on said roller.

The cam-slot L, which operates the holder-bar, has, first, starting from the outer or stubble end, a long straight track, forming the rear side or edge of the transverse plate H, and upon which the stud or anti-friction roller runs; next, an incline, $l$, which receives said stud or roller. Then from this incline it has a short straight reach, $l'$; again, a second incline, $l^2$, trending in the same direction as the former, and, finally, a straight reach, $l^3$, running inward to such a distance as may be required to allow the carriage to gain the end of its inward traverse.

To thread the machine, the cord is first run through the eye of the binder-arm when this arm is at or near the end of the inward traverse. Then, the arm being entirely depressed, the end of the cord is brought up from its point through the slot in the knotting-head and the carriage started on its outward traverse. The holder-bar is at the moment retracted, its wrist-pin being in the straight reach $l^3$, but as it passes the successive inclines will be eventually carried outward a sufficient distance to clamp the end of the cord on the outer or rear side of the receiving-slot between the under surface of its projection or tongue and the corrugated roller, or whatever other stationary jaw is used. In such position the cord will be held when the carriage reaches the end of its outward traverse; but at this time the binder-arm rises, bringing the cord up through the receiving-slot and into the notch in the knotting-head, and of course in the base-plate, so that it stretches therethrough behind the projection or tongue. Then as the carriage moves inward in the next binding operation the holder-bar will first be withdrawn by the initial incline of the cam-slot a sufficient distance to clamp this strand on the other side of the slot between its own under surface and the contiguous bottom of the channel in which it moves, releasing it at the point when first grasped. Next, it has a further movement in the same direction, caused by the second incline, thereby pulling an additional length from the spool and doubling it in the channel, and, finally, it comes to rest while its roller is traveling along the inner straight reach, $l^3$. The binder-arm now descends, encircling the gavel, and of course carrying the new strand into the slot in the knotting-head or holder-plate and on the outer side of the tongue on the holder-bar, as in the original clamping operation, since the tongue has been restored to the same position it occupied at that time. Then the carriage starts toward the stubble side and the knotter begins to revolve. At that moment in its revolution when it demands slack the holder-bar strikes the second incline, or that which is in this outward movement, and is projected a sufficient distance, giving up slack from the clamping end of the cord, while that slack which is demanded from the other strand is pulled from the spool through the eye of the binder-arm. Next it strikes the short straight reach, during which it is held stationary, no slack being required, as the knotter is now returning upon the cord in completing its revolution. Then as the open knotter-jaws receive and close upon the crossed strands the holder-bar is given its final projection by the outer incline, driving its tongue across the slot, severing the old ends against a cutter overlying the edge of said slot, and clamping the new end from the point of the binder-arm, as before.

The cutter M is a plate attached to the knotter base-plate and arranged so that the tongue $k'$ of the holder-bar will come in contact therewith to sever the cord at the proper moment.

Figure 8:
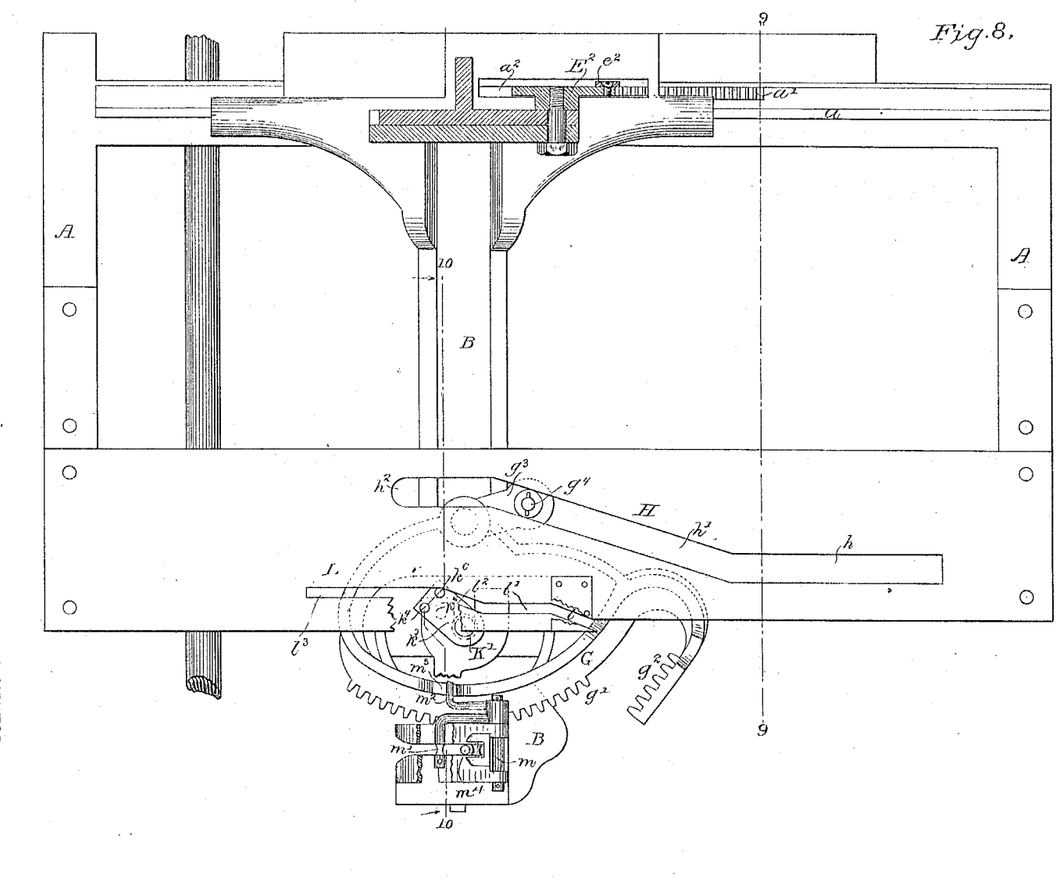
Fig. 8, a top plan of the binding attachment in section on the line 8 8, Fig. 1, and with the receiver or binding-table removed.
Figure 9:
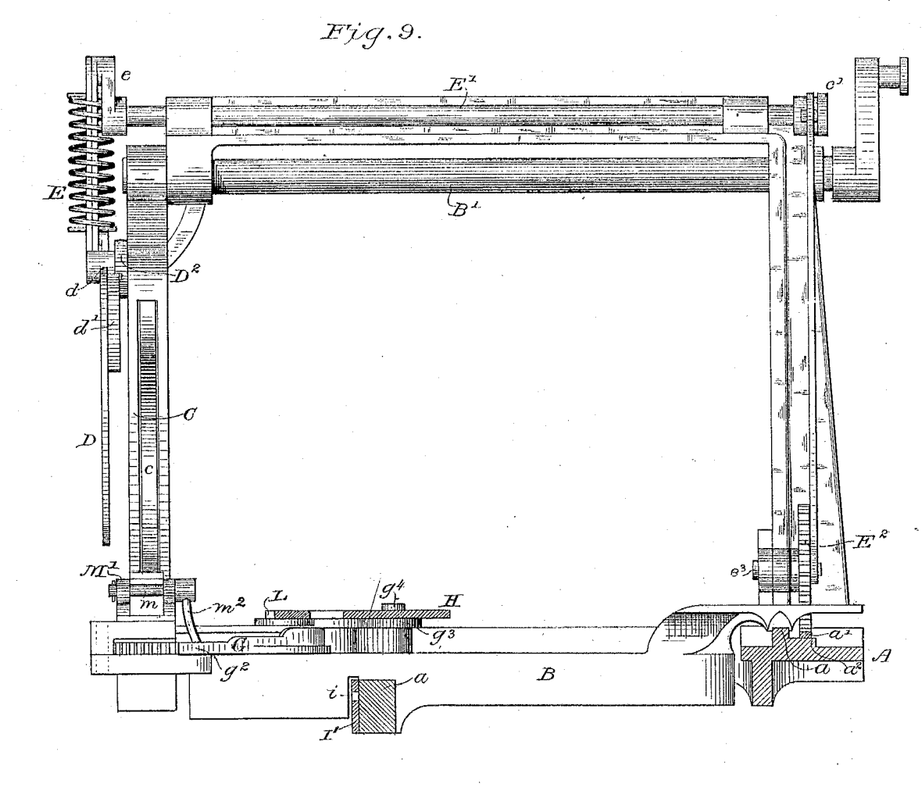
Fig. 9, a vertical transverse section through said attachment, looking from the stubble side.

The knotter is covered with the usual cap, M', in the rear end of which is journaled a short rock-shaft, $m$, carrying a bent guide-arm, $m'$, which is brought around in front of said knotter across the receiving-slot, as shown in Fig. 8 of the drawings. A second bent arm or tappet, $m^2$, is also attached to the shaft and led inward to rest upon a flange on the sector which operates the knotter. In this flange is a cam-notch, $m^3$, and as long as the tappet-arm rides on the flange the guide-arm will be held up about level with the jaws of the knotter tying-bill, in which position it supports the cord; but when the tappet-arm drops into the cam-notch the guide-arm falls beneath said jaws, out of the way of the cord. In order to prevent this guide-arm from rising too far, it has a pin, $m^4$, which strikes against the under surface of the cap, and this pin serves, also, to keep the cord from being carried laterally off the arm by the rotation of the knotter. By this guide-arm the two strands of the cord are intended to be raised, immediately after the knotter has passed the receiving-slot in its revolution, into such position that as it comes around to said slot in completing the revolution, with its jaws opened, the strands will certainly be directed between said jaws and seized thereby as the latter close.

Figures 18, 19, 20, 21:
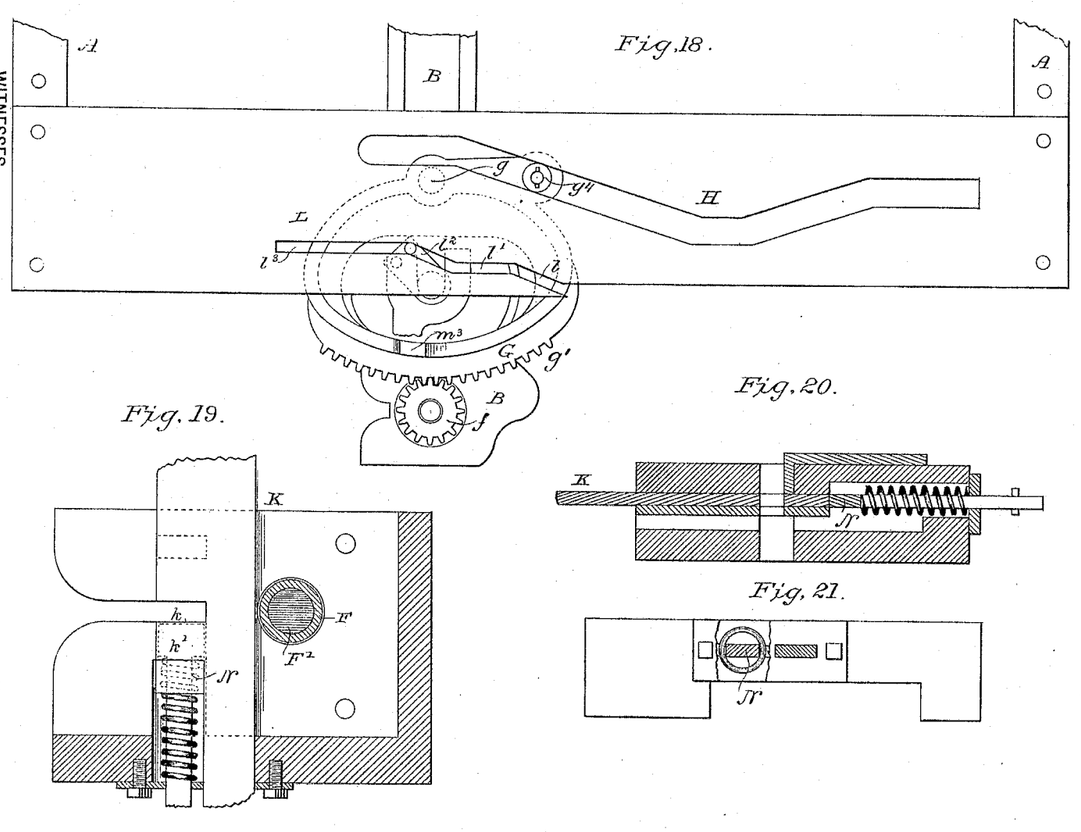
Fig. 18, a partial plan with knotter removed, showing a modification in the knotting-gear and reversing device.
Figs. 19, 20, and 21, details, respectively, in horizontal and transverse section and end elevation, of a modification in the cutting and holding device.

In Fig. 18 of the drawings is shown an alternative construction of the sector, which, instead of being provided with two sections of gear-teeth to give the reverse movement, has but a single section. As thus formed the reversal of the knotter at the proper moment is effected by making the cam-slot which operates said sector with two reverse inclines—one of them a long one, to give the full revolution, or revolution and a quarter substantially, to the knotter, and the second a short one, to give the short reverse movement. This form is deemed preferable.

Figs. 19, 20, and 21 represent a modification of the cord-holder, in which a spring clamping-jaw, N, is arranged to bear against the edge of the tongue $k'$ on the holder-bar, blocking it and yielding before it from the moment it passes the slot, so that the cord in said slot will be cut and held between said jaw and the tongue just before it is severed against the overlying cutter-plate.

The operation of the machine, except as hereinbefore incidentally mentioned, is as follows: Sufficient grain being delivered from the elevator to the inner portion of the receiver, either by packers (for which purpose the tripping-packers shown and described in an application filed by me on the 14th day of January, 1881, Serial No. 24,009, and of which this is a division, may be employed, among others) or as heretofore, and the binding mechanism started, the binder-carriage moves inward, the binder-arm descends and encircles the gavel, the tucker operates to place the new strand brought down by the binder-arm properly in the receiving-slot alongside of the old, and the carriage starts outward. The mutilated gear immediately engages with its rack, thereby rocking that shaft connected to the heel of the compressor, giving the latter an extra movement, first to squeeze up the bundle more tightly and then to release it by returning to its former position. The geared sector which operates the knotter commences its motion an instant before this operation takes place, so that the knotter will, in the first part of its revolution, have slack from the band around the gavel. As the knotter revolves, it takes both of the cords, which are now stretched, straight down past it into the receiving-slot, one to the holder and the other to the point of the binding-arm, and thence to the spool, the cord-guide being at the moment down, so as not to interfere with them; but just as the knotting-jaws have passed the receiving-slot the guide-arm is raised, thereby bringing both strands up to a level with the crevice or opening between the two jaws of the knotter. Next the holder-bar has its initial movement to render slack to the revolving knotter. Now, in making about one revolution and a quarter, it will be seen that the knotter will form a loop around its two parts, and its jaws being opened will at the proper moment take the horizontal strands between them as they cross the receiving-slot the second time. These jaws, which have preferably remained open during the whole revolution, but not necessarily so, now close, thereby clamping the loose strands simultaneously between them. At this instant the holder-bar receives its final projection, cutting off the spool-cord and securing the new end on the outside of the receiving-slot against the corrugated roller or the bottom of its guiding-channel, and also releasing the cord on the inside of said slot.

The loop while being formed has been prevented from slipping back on the knotter by means of the little projection on the chin of the lower jaw, so that at that point of the revolution where the two jaws are brought together the loop will be just beyond or outside the contact-point of the stripper with said knotter. The reverse movement of the knotter is now effected, when the dog will shed the loop from the end of the knotter. The two strands held between the jaws will be received into the notch in the stripper, and the loop will be carried back by the receiving-jaws without being affected by said stripper, thereby tightening the knot toward the bundle. Finally, as the reciprocating carriage approaches the termination of its outward movement, the knotter-jaws will be positively opened by a suitable depression in the cam-slot which operates the actuating-lever, thereby releasing the knot and permitting the free discharge of the bundle, the binder-arm rises, and the carriage either comes to rest, if automatic tripping mechanism controls its movements, or else immediately starts upon its inward journey to collect and bind a succeeding bundle.

I do not wish to be understood as limiting myself to all the particular devices which have been described above and are shown in the drawings, for changes may be made in said devices, and in some instances others substituted, without materially changing the principal features of my invention.

I claim—

1. The combination, substantially as hereinbefore set forth, of the binder-arm, the compressor pivoted thereto and closed positively thereby as the arm descends, and means whereby said compressor is given a further elastic movement at the end of its positive movement.

2. The combination, substantially as hereinbefore set forth, of a vibrating binder-arm, a compressor connected with the binder-arm practically as explained, whereby it is opened and closed by the opening and closing of said arm, and means whereby after the closing of the binder-arm and compressor the latter is independently operated to first still further compress the bundle and then return to the starting-point of said independent movement to release said bundle to the initial state of compression.

3. The combination, substantially as hereinbefore set forth, of the binder-arm, the compressor pivoted thereto practically as explained, whereby it has a sliding movement independent of its pivotal movement, the rock-shaft connected to the compressor, the pitman, the mutilated gear, and means for operating said gear.

4. The combination, substantially as hereinbefore set forth, of the binder-arm, the compressor pivoted thereto practically as explained, whereby it has a sliding movement independent of the pivotal movement, the rock-shaft connected to the compressor, the mutilated gear connected to the rock-shaft, the sliding carriage upon which the foregoing parts are mounted, and the rack and delay-tracks on the stationary frame.

5. The combination, substantially as hereinbefore set forth, of the binder-arm, the compressor pivoted thereto practically as explained, whereby it has a sliding movement independent of its pivotal movement, the yielding link and the rock-shaft connected to the heel of the compressor by said link, and means for oscillating said rock-shaft after the binder-arm has closed to give the compressor an additional pivotal movement.

6. The combination, substantially as hereinbefore set forth, of the binder-arm, the compressor, the pivot-pin through which said compressor slides, the rib on said compressor, slotted and having a stop, as described, the stop-pin beyond the rib, the guard-rim fixed to the side of the binder-arm and encircling the pivot-pin and slotted at points diametrically opposite each other, the internal stop-lug alongside one of said slots, the rock-shaft, and the link connecting the heel of the compressor with said rock-shaft.

7. The combination, substantially as hereinbefore set forth, of the knotter, composed of two jaws arranged to close upon each other, and a stripper bearing upon said knotter to shed the loop, and slotted at its point to admit the crossed ends held within the jaws, whereby said loop will be run up toward the gavel while the ends are still held.

8. The combination, substantially as hereinbefore set forth, of a knotter or tying-bill composed of two jaws arranged to close upon each other, a stripper bearing upon said jaws to shed the loop, and slotted at its contacting end to admit the strands held within said jaws, and mechanism actuating the knotter practically as explained, to revolve it sufficiently to take the cord and form the loop and grasp the end strands, next to close the jaws upon said strands, and finally reverse said knotter to shed the loop and draw the end strands through.

9. The knotter composed of two jaws, one of which opens away from the other, in combination with the spring-pressed stripper having a notch in its outer end coming opposite the crevice between said jaws.

10. The combination, substantially as hereinbefore set forth, of the lower knotter-jaw having a pendent stop, the upper jaw opening and closing toward the other, and the notched spring-pressed stripper.

11. The combination, substantially as hereinbefore set forth, of the tubular shaft carrying one jaw of the knotter, the inclosed spindle carrying the second jaw, the lever yoked to the lower end of spindle, the reciprocating carriage bearing said knotter and lever, and the cam-slot in the stationary way upon which said carriage slides, receiving the free end of the lever, whereby the said lever is vibrated to open and close the jaws as the carriage moves inward and outward.

12. The combination, substantially as hereinbefore set forth, with the knotter or tying-bill, of the vibrating cord-guide, its rock-shaft, the tappet extending from said rock-shaft, and the guide-flange on the actuating-sector, having a cam-notch, into which the end of said tappet drops at the proper time to lower the cord-guide away from the knotter.

13. The combination, substantially as hereinbefore set forth, of a rotating knotter or tying-bill, a pinion upon its shank, a vibrating sector provided with a single section of gear-teeth, a crank-arm attached to the sector, a reciprocating carriage upon which the knotter and sector are mounted, and a cam-slot in a stationary plate on the frame over which said carriage travels, of essentially the shape described, whereby the sector is vibrated to rotate the hook in one direction to form the loop, and then is reversed toward the end of its movement to cause the knotter to shed the loop and draw the end strands through.

14. The combination, substantially as hereinbefore set forth, of a reciprocating clamping-bar, a slotted plate in which it moves over friction-surfaces which form the converse part of the holder, and mechanism operating to move said bar to seize the spool-cord first on one side of the slot and then to seize the same cord on the other side of said slot, carrying it in the reverse direction to provide a slack length, and finally to return the bar in the original direction to give up the slack to the holder and to grasp the new strand from the spool.

15. The combination, substantially as hereinbefore set forth, of the reciprocating holder-bar, constructed as described, the friction-plates over which it moves, the crank-arm to actuate it, the traversing binding carriage, upon which said parts are mounted, and the cam-slot in the stationary plate over which said carriage travels to operate the crank-arm and thereby the holder-bar.

CHAS. B. WITHINGTON.

Witnesses:
  W. J. DUNN,
  JOHN V. A. HASBROOK.